(12) United States Patent
Tanaka

(10) Patent No.: US 7,565,573 B2
(45) Date of Patent: Jul. 21, 2009

(54) DATA-DUPLICATION CONTROL APPARATUS

(75) Inventor: Michiyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/085,542

(22) Filed: Mar. 22, 2005

(65) Prior Publication Data

US 2006/0143507 A1   Jun. 29, 2006

(30) Foreign Application Priority Data

Dec. 17, 2004   (JP)   ............... 2004-366730

(51) Int. Cl.
*G06F 11/00* (2006.01)
(52) U.S. Cl. ......................................................... 714/7
(58) Field of Classification Search ....................... 714/7
See application file for complete search history.

(56) References Cited

U.S. PATENT DOCUMENTS

| | | | |
|---|---|---|---|
| 5,548,712 A * | 8/1996 | Larson et al. | 714/7 |
| 5,572,661 A * | 11/1996 | Jacobson | 714/7 |
| 5,611,069 A | 3/1997 | Matoba | |
| 5,657,439 A * | 8/1997 | Jones et al. | 714/7 |
| 5,727,144 A | 3/1998 | Brady et al. | |
| 6,058,454 A * | 5/2000 | Gerlach et al. | 711/114 |
| 6,754,767 B2 * | 6/2004 | Gold | 711/114 |
| 6,854,034 B1 | 2/2005 | Kitamura et al. | |
| 6,907,498 B2 | 6/2005 | Kitamura et al. | |
| 6,952,794 B2 * | 10/2005 | Lu | 714/7 |
| 7,013,408 B2 * | 3/2006 | Knapp, III | 714/7 |
| 7,136,964 B2 * | 11/2006 | Yamamoto | 711/114 |
| 7,143,308 B2 * | 11/2006 | Tseng et al. | 714/6 |
| 7,213,165 B2 * | 5/2007 | Umberber et al. | 714/7 |
| 7,213,166 B2 * | 5/2007 | Franklin et al. | 714/7 |
| 7,257,676 B2 * | 8/2007 | Corbett et al. | 711/114 |
| 7,281,158 B2 * | 10/2007 | Yamamoto et al. | 714/7 |
| 2003/0229820 A1 * | 12/2003 | Chatterjee et al. | 714/7 |
| 2005/0114728 A1 * | 5/2005 | Aizawa et al. | 714/6 |
| 2005/0149688 A1 | 7/2005 | Kitamura et al. | |
| 2008/0256148 A1 | 10/2008 | Kitamura et al. | |

FOREIGN PATENT DOCUMENTS

| | | |
|---|---|---|
| JP | 7-129331 | 5/1995 |
| JP | 8-249133 | 9/1996 |
| JP | 2001-142648 | 5/2001 |
| JP | 2002-278706 | 9/2002 |

OTHER PUBLICATIONS

Japanese Office Action mailed Feb. 17, 2009 in corresponding Japanese Application No. 2004-366730 (3 pages) (3 pages partial translation).

* cited by examiner

*Primary Examiner*—Bryce P Bonzo
(74) *Attorney, Agent, or Firm*—Staas & Halsey LLP

(57) ABSTRACT

A data-duplication control apparatus that controls a duplication process for duplicating data stored in a storage device that constitutes redundant-array-of-independent-disks includes an information storing unit that stores information on a type of the redundant-array-of-independent-disks of the storage device; and a duplication-source-device selecting unit that selects a storage device of a duplication source based on the information stored.

13 Claims, 7 Drawing Sheets

RAID-TYPE MANAGEMENT TABLE 62

| IDENTIFICATION NUMBER | TYPE | HDD DEVICE CONFIGURATION |
|---|---|---|
| 1 | RAID1 | HDD0,HDD8 |
| 2 | RAID1 | HDD1,HDD9 |
| 3 | RAID0+1 | HDD2,HDD3,HDD10,HDD11 |
| 4 | RAID5 | HDD4,HDD5,HDD6,HDD7 |
| 5 | RAID5 | HDD12,HDD13,HDD14,HDD15 |
| 6 | BACKUP | HDD16,HDD17,HDD18 | ated by combining a plurality of hard disk devices.
DATA-DUPLICATION CONTROL APPARATUS

BACKGROUND OF THE INVENTION

1) Field of the Invention

The present invention relates to a data-duplication control apparatus that performs a control for a duplication process of duplicating data stored in a storage device constituting a redundant-array-of-independent-disks (RAID), and more particularly, to a data-duplication control apparatus that can execute a redundant copy of data when hard disk devices of different RAID types are used in a combined manner.

2) Description of the Related Art

Conventionally, a RAID system realizes an improvement of performance, such as a speed of reading and writing data, an increase of storage capacity, and an improvement of reliability by combining a plurality of hard disk devices.

The RAID system is designed in such a manner that data is saved even if there is a failure in one of the hard disk devices constituting the RAID system. For example, in RAID1 and RAID0+1, the same data is redundantly stored in two hard disk devices.

Furthermore, in RAID2, RAID3, RAID4, and RAID5, error check and correction (ECC) information and parity information are written in other hard disk device to recover data of a hard disk device having a failure, even when a failure has occurred in one hard disk device.

However, in the RAID 1 and the RAID0+1, the redundancy of data is lost if a failure has occurred in one of the hard disk devices in which the same data is stored.

To prevent such problems, a method called redundant copy has been developed. In the redundant copy, a copy of data stored in a hard disk device is created in a backup hard disk device in preparation for an occurrence of a failure in the hard disk device (see, for example, Japanese Patent Application Laid-Open Publication No. Hei8-249133).

However, because the conventional technology described above sets a copy-source hard disk device for the redundant copy in a fixed manner, it is not possible to perform the redundant copy effectively.

In other words, because the copy-source hard disk device is determined regardless of the RAID type such as RAID1, RAID0+1, and RAID5 when hard disk devices of different RAID types are used in a combined manner, the redundant copy may have failed or a load on a RAID device may have increased when performing the redundant copy.

For example, the same data is stored in two hard disk devices in the RAID1 or the RAID0+1, however, if a hard disk device that is anticipated to have a failure is set to a copy source in a fixed manner, a risk of having a failure in the hard disk device at a time of performing the redundant copy becomes high.

In the RAID5, the parity information that is used to recover data stored in a hard disk device having a failure is stored in a plurality of hard disk devices in a distributed manner, and when a failure has occurred in one hard disk device, data is recovered from the parity information stored in other hard disk device.

Although it is possible to perform a redundant copy to create a copy of data stored in a hard disk device in other hard disk device using the parity information, the recovery of data using the parity information is not desirable because it causes a considerable load to the RAID device.

For this reason, it is extremely important how to perform a redundant copy of data effectively when hard disk devices of different RAID types are used in a combined manner.

SUMMARY OF THE INVENTION

It is an object of the present invention to solve at least the above problems in the conventional technology.

A data-duplication control apparatus according to one aspect of the present invention, which controls a duplication process for duplicating data stored in a storage device that constitutes redundant-array-of-independent-disks, includes an information storing unit that stores information on a type of the redundant-array-of-independent-disks of the storage device; and a duplication-source-device selecting unit that selects a storage device of a duplication source based on the information stored.

A data-duplication control method according to another aspect of the present invention, which is for controlling a duplication process for duplicating data stored in a storage device that constitutes redundant-array-of-independent-disks, includes storing information on a type of the redundant-array-of-independent-disks of the storage device; and selecting a storage device of a duplication source based on the information stored.

A computer-readable recording medium according to still another aspect of the present invention stores a data-duplication control program for controlling a duplication process for duplicating data stored in a storage device that constitutes redundant-array-of-independent-disks. The data-duplication control program causes a computer to execute the above method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of a data-duplication control apparatus according to the present invention will be explained in detail below with reference to the accompanying drawings. In the following embodiments, a case in which the data-duplication control apparatus is a RAID device is explained.

Figure 1:
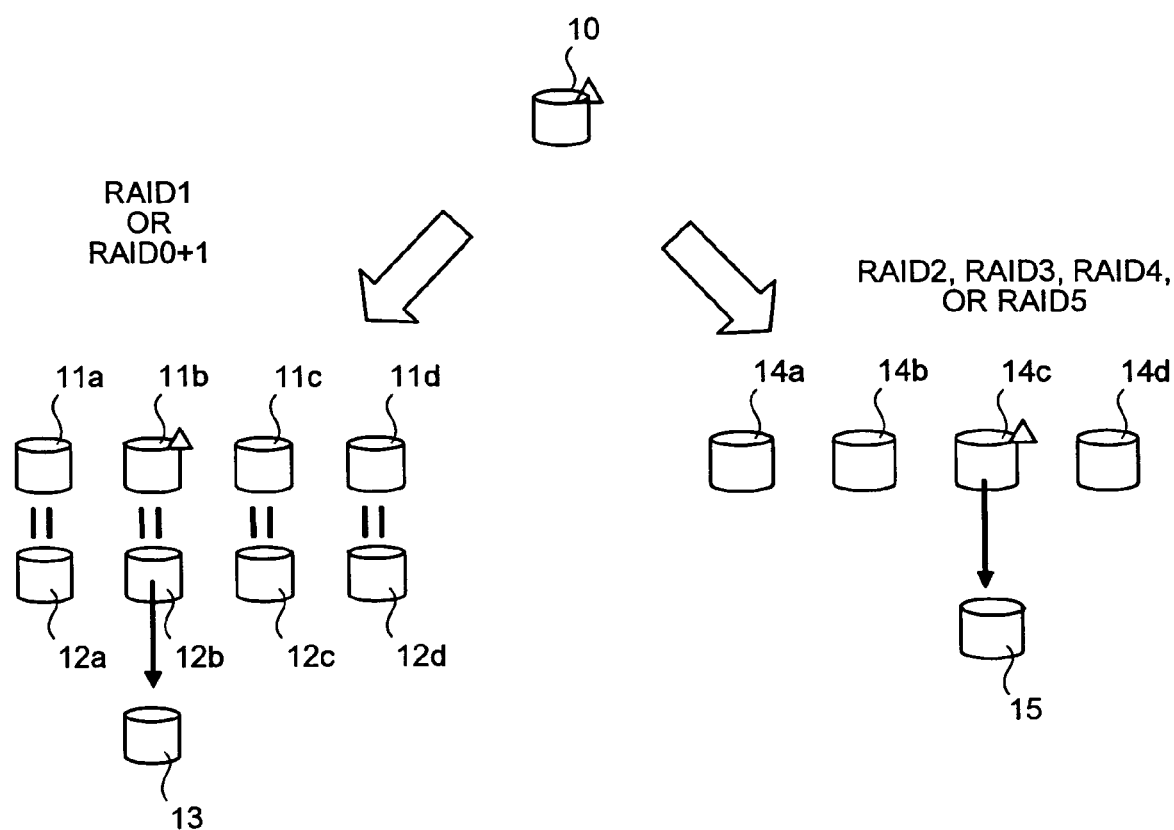
FIG. 1 is a schematic diagram for illustrating a concept of a data-duplication control process according to the present invention.

FIG. 1 is a schematic diagram for illustrating a concept of a data-duplication control process according to the present invention. In this data-duplication control process, a sign of a failure is detected in a hard disk device 10 from among a plurality of hard disk devices that constitute the RAID, and when a redundant copy to create a copy of data in other hard disk device, a hard disk device of a copy source is selected based on a RAID type.

In the example shown in FIG. 1, a hard disk device 12b or 14c is selected based on whether a RAID type of hard disk devices 10, 11b, and 14c from which the sign of a failure has been detected is RAID1, RAID0+1, RAID2, RAID3, RAID4, or RAID5.

In the RAID1 or the RAID0+1, because there are two sets of hard disk devices 11a to 11d and 12a to 12d in which the same data is stored by mirroring, when the sign of a failure has been detected from the hard disk device 11b, the hard disk device 12b is selected as the copy source, and a copy of data is created to other hard disk device 13.

In this manner, it is possible to perform a redundant copy for sure by setting the hard disk device 12b with a slim possibility of a failure as the hard disk device of the copy source.

On the other hand, in the RAID2, the RAID3, the RAID4, or the RAID5, the hard disk device 14c from which sign for a failure has been detected is selected as the copy source, and a redundant copy to create a copy of data in other hard disk device 15 is performed.

For example, if data of the hard disk device 14c is created from parity information of the data of the hard disk device 14c, which is stored in the hard disk devices 14a, 14b, and 14d, a considerable load is imposed on the RAID device. For this reason, the hard disk device 14c from which the sign of failure has been detected is set as the copy source to avoid the load on the RAID device.

With this mechanism, in this data-duplication control process, because a hard disk device of a copy source is selected based on information on a RAID type at a time of performing a redundant copy, it is possible to perform the redundant copy effectively.

Figure 2:
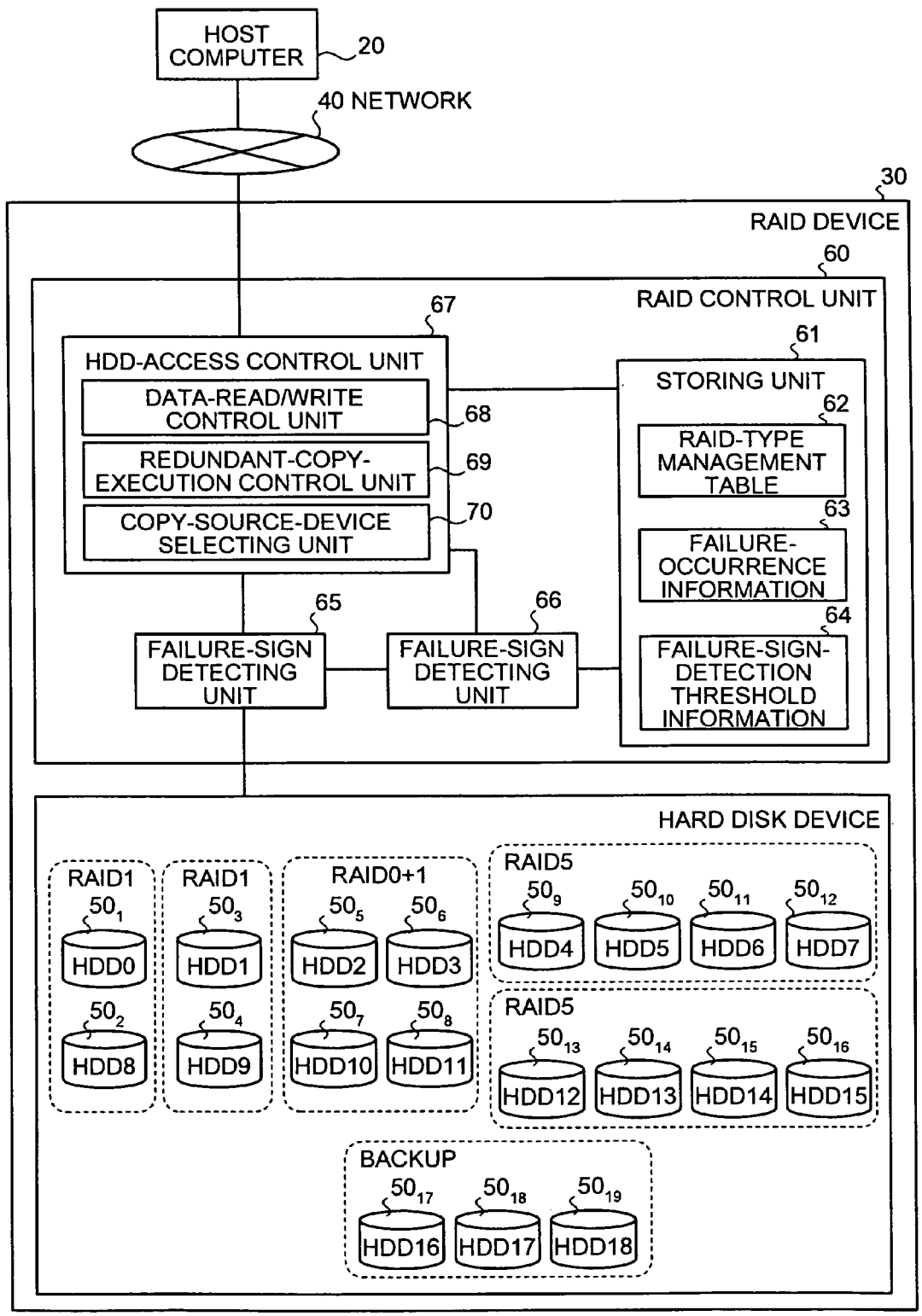
FIG. 2 is a schematic diagram for illustrating a functional configuration of a RAID device 30 according to an embodiment of the present invention.

FIG. 2 is a schematic diagram for illustrating a functional configuration of a RAID device 30 according to an embodiment of the present invention. The RAID device 30 is connected to a host computer 20 via a network 40. The host computer 20 makes a request for storing or readout of data to the RAID device 30.

The RAID device 30 is a desk device in which a plurality of hard disk devices are combined to stored data in a redundant manner. The RAID device 30 not only stores the data in a redundant manner, but also performs a redundant copy of storing data of hard disk devices $50_1$ to $50_{16}$ in other hard disk devices $50_{17}$ to $50_{19}$, when a sign of a failure has been detected from the hard disk devices $50_1$ to $50_{16}$ that constitute the RAID device 30.

At this moment, the RAID device 30 performs a process to select a hard disk device $50_1$ to $50_{16}$ of a copy source for the redundant copy based on a RAID type of the hard disk device $50_1$ to $50_{16}$ from which the sign of a failure has been detected.

The RAID device 30 is constituted with the hard disk devices $50_1$ to $50_{19}$ and a RAID control unit 60. The hard disk devices $50_1$ to $50_{19}$ includes the hard disk devices $50_1$ to $50_{16}$ that forms a plurality of RAID groups and hard disk devices $50_{17}$ to $50_{19}$ that becomes a copy destination at a time of performing a redundant copy.

In the example shown in FIG. 2, the hard disk devices $50_1$ and $50_2$ and the hard disk devices $50_3$ and $50_4$ form RAID groups whose RAID type is the RAID1; the hard disk devices $50_5$ to $50_8$ forms a RAID group whose RAID type is the RAID0+1; and the hard disk devices $50_9$ to $50_{12}$ and the hard disk devices $50_{13}$ to $50_{16}$ form RAID groups whose RAID type is the RAID5.

The hard disk devices $50_{17}$ to $50_{19}$ are set as the hard disk devices of the copy destination to which a copy of data of the hard disk device 50 from which the sign of a failure has been detected at a time of performing a redundant copy.

The RAID control unit 60 includes a storing unit 61, a command processing unit 65, a failure-sign detecting unit 66, and an HDD-access control unit 67.

The storing unit 61 is a storage device such as a memory. The storing unit 61 stores a RAID-type management table 62, failure-occurrence information 63, and failure-sign-detection threshold information 64.

Figures 3, 4:
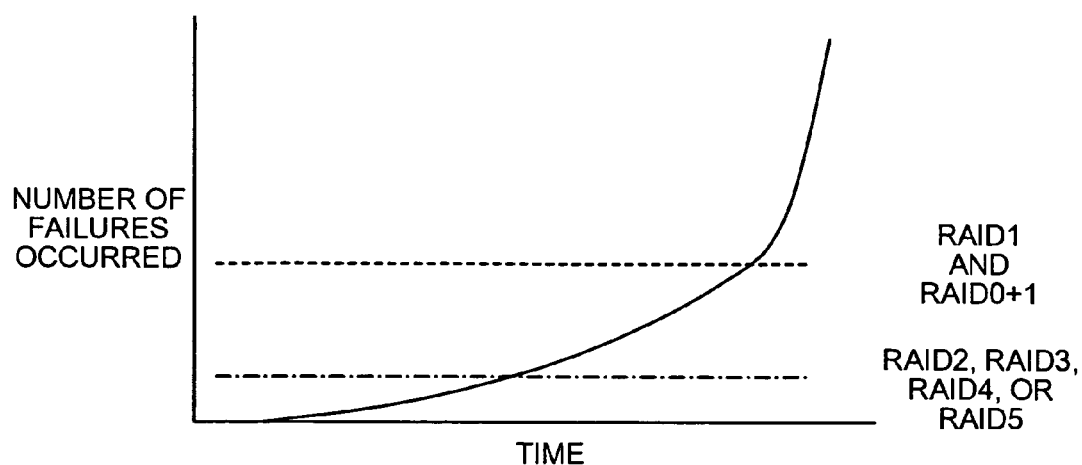
FIG. 3 is a table of an example of a RAID-type management table 62.
FIG. 4 is a graph for explaining a threshold setting for each of the RAID types.

The RAID-type management table 62 stores information on a RAID type of each of the hard disk devices $50_1$ to $50_{19}$. FIG. 3 is a table of an example of the RAID-type management table 62 shown in FIG. 2.

As shown in FIG. 3, the RAID-type management table 62 stores an identification number, a type, and information on HDD device configuration. The identification number is a number for identifying each of the RAID groups set on the hard disk devices $50_1$ to $50_{16}$, or a group of the backup hard disk devices $50_{17}$ to $50_{19}$ that become a copy destination at a time of performing a redundant copy.

The type is information indicating a RAID type of each of the RAID groups, or information indicating, when a group is the group of the backup hard disk devices $50_{17}$ to $50_{19}$ that become a copy destination at a time of performing a redundant copy, that the group is a backup group.

The HDD device configuration is stores identification information for the hard disk devices $50_1$ to $50_{16}$ included in each of the RAID groups, and the hard disk devices $50_{17}$ to $50_{19}$ included in the backup group.

Referring back to FIG. 2, the failure-occurrence information 63 includes information on the number of failures occurred in each of the hard disk devices $50_1$ to $50_{16}$ in association with the identification information for identifying each of the hard disk devices $50_1$ to $50_{16}$. The number of failures occurred in this example is an accumulated value, however, the number of failures occurred in a unit time can be used instead.

The failure-sign-detection threshold information 64 includes information on a threshold to be used to compare with the number of failures occurred for each of the RAID types. When the number of failures occurred has exceeded the threshold, it is determined that there is a sign of a failure in the hard disk devices $50_1$ to $50_{16}$.

FIG. 4 is a graph for explaining a threshold setting for each of the RAID types. As shown in FIG. 4, the number of failures occurred in each of the hard disk devices $50_1$ to $50_{16}$ increases with time. The threshold for the hard disk devices $50_1$ to $50_{16}$ of the RAID2, the RAID3, the RAID4, or the RAID5 is set to a value smaller than the threshold for the hard disk devices $50_1$ to $50_{16}$ of the RAID1 or the RAID0+1.

This is because the hard disk devices $50_1$ to $50_{16}$ that store the same data by mirroring do not exist in the RAID2, the RAID3, the RAID4, or the RAID5, and as a result, the sign of a failure is detected earlier.

Referring back to FIG. 2, the command processing unit 65 performs a process of transmitting a command for reading or writing data with respect to the hard disk devices $50_1$ to $50_{19}$, a process or transmitting and receiving data, and a process of receiving a result of executing the command. The result of executing the command includes successful-termination information when the reading or writing of data is terminated normally and error information when the reading or writing of data is not terminated normally.

Furthermore, when the HDD-access control unit 67 receives data to be stored in the hard disk devices $50_1$ to $50_{19}$ from the host computer 20, the command processing unit 65 receives the data from the HDD-access control unit 67, and transfers the data received to the hard disk devices $50_1$ to $50_{19}$.

Moreover, when the HDD-access control unit 67 receives a request for reading data stored in the hard disk devices $50_1$ to $50_{19}$ from the host computer 20, the command processing unit 65 transfers the data read from the hard disk devices $50_1$ to $50_{19}$ to the HDD-access control unit 67.

The failure-sign detecting unit 66 performs a process of detecting a sign of a failure in the hard disk devices $50_1$ to $50_{16}$ by referring to the RAID-type management table 62 the failure-occurrence information 63, and the failure-sign-detection threshold information 64 stored in the storing unit 61.

The failure-sign detecting unit 66 detects whether there is a sign of a failure by checking if the number of failures occurred in the hard disk devices $50_1$ to $50_{19}$ exceeded a threshold set for each of the RAID types.

The HDD-access control unit 67 performs a control of executing a process of reading or writing data with respect to the hard disk devices $50_1$ to $50_{19}$ when a request for a data read or a data write is received from the host computer 20.

Furthermore, the HDD-access control unit 67 performs, when a sign of a failure has been detected from the hard disk devices $50_1$ to $50_{19}$ by the failure-sign detecting unit 66, a control of executing a redundant copy to make a copy of data from the hard disk devices $50_1$ to $50_{16}$ of a copy source determined according to the RAID type to the backup hard disk devices $50_{17}$ to $50_{19}$.

The HDD-access control unit 67 includes a data-read/write control unit 68, a redundant-copy executing unit 69, and a copy-source-device selecting unit 70. The data-read/write control unit 68 receives a request for a data read or a data write from the host computer 20, and makes a request for transmitting a command for executing a data-read process or a data-write process to the hard disk devices $50_1$ to $50_{19}$ with respect to the command processing unit 65.

Furthermore, the data-read/write control unit 68 transmits data for which a write request is received from the host computer 20 to the hard disk devices $50_1$ to $50_{19}$ via the command processing unit 65, and receives data for which a read request is received from the host computer 20 from the command processing unit 65, and outputs the data received to the host computer 20.

Moreover, the data-read/write control unit 68 receives information on a failure occurred at a time of a read process or a write process with respect to the hard disk devices $50_1$ to $50_{19}$ from the hard disk devices $50_1$ to $50_{19}$ via the command processing unit 65, and stores the information received in the storing unit 61 as the failure-occurrence information 63.

The redundant-copy-execution control unit 69 performs, when a sign of a failure has been detected from the hard disk devices $50_1$ to $50_{16}$ by the failure-sign detecting unit 66, a control of executing a redundant copy to make a copy of data from the hard disk devices $50_1$ to $50_{16}$ to the backup hard disk devices $50_{17}$ to $50_{19}$.

The copy-source-device selecting unit 70 performs, when the redundant-copy-execution control unit 69 performs a control of executing a redundant copy, a process of selecting a hard disk device $50_1$ to $50_{16}$ that becomes a copy source of data according to the RAID type.

For example, when the RAID type of a hard disk device $50_1$ to $50_{16}$ from which a sign of a failure has been detected is the RAID2, the RAID3, the RAID4, or the RAID5, the copy-source-device selecting unit 70 selects the hard disk device $50_1$ to $50_{16}$ from which the sign of a failure has been detected as the hard disk device $50_1$ to $50_{16}$ of a copy source at a time of performing the redundant copy.

On the other hand, when the RAID type of a hard disk device $50_1$ to $50_{16}$ from which a sign of a failure has been detected is the RAID1 or the RAID0+1, the copy-source-device selecting unit 70 selects the hard disk device $50_1$ to $50_{16}$ of a copy source based on whether there is a data-read access or a data-write access with respect to the hard disk device $50_1$ to $50_{16}$.

Figure 5:
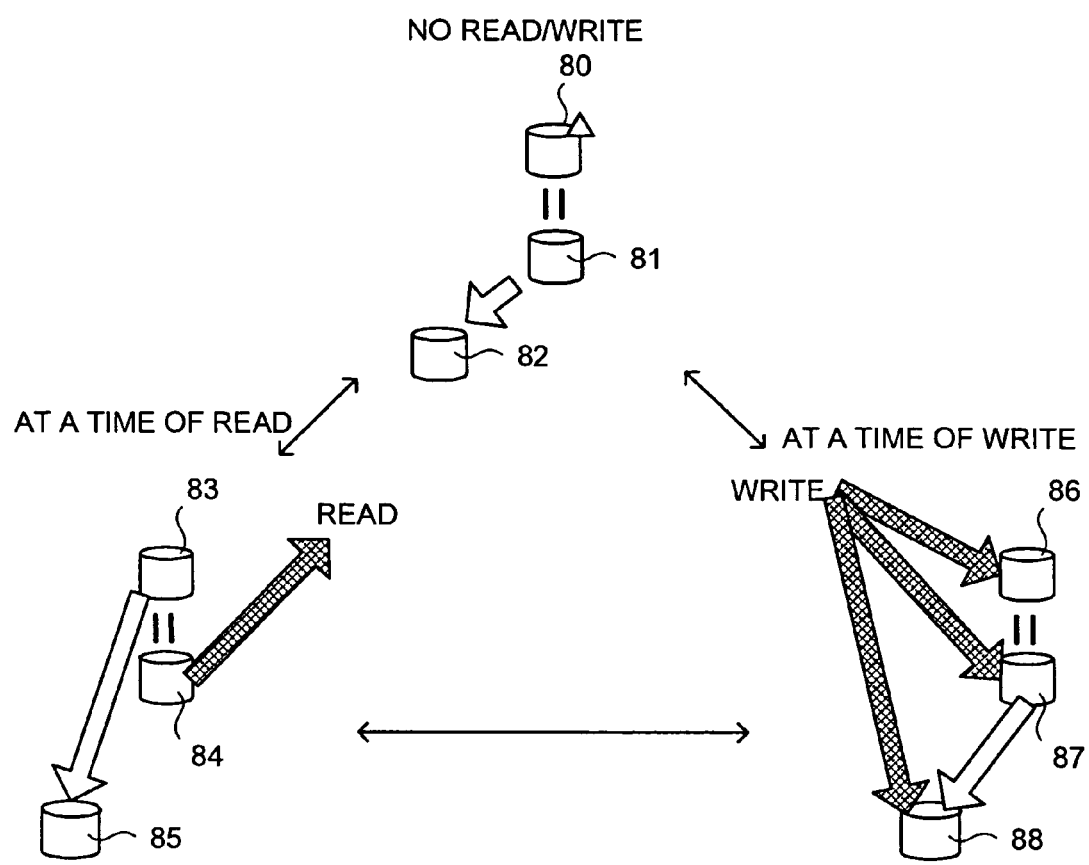
FIG. 5 is a schematic diagram for illustrating a selection process for a copy-source hard disk device $50_1$ to $50_{16}$, based on a presence of a read/write access to data.

FIG. 5 is a schematic diagram for illustrating a selection process for a copy-source hard disk device $50_1$ to $50_{16}$, based on a presence of a read/write access to data. When there is no data-read/write access, the copy-source-device selecting unit 70 sets a hard disk device 81 from which no sign of a failure has been detected as a copy source from among the hard disk devices 80 and 81 to which the same data is stored by mirroring; and the redundant-copy-execution control unit 69 performs a control of copying data with respect to a backup hard disk device 82.

On the other hand, when there is a data-read/write access, the copy-source-device selecting unit 70 sets a hard disk device 83 from which a sign of a failure has been detected, as a copy source, from among the hard disk devices 83 and 84 to which the same data is stored by mirroring; and the redundant-copy-execution control unit 69 performs a control of copying data with respect to a backup hard disk device 85.

Subsequently, the data-read/write control unit 68 performs a control of executing a process of reading data from the hard disk device 84 from which no sign of a failure has been detected. When the redundant copy is not successfully performed, the copy-source-device selecting unit 70 sets, when the read process is completed, the hard disk device 84 from which no sign of a failure has been detected to the copy source; and the redundant-copy-execution control unit 69 copies the data for which the redundant copy has failed.

In this manner, when there is a data read access, a priority is put on reading the data, and the data is read from the hard disk device 84 from which no sign of a failure has been detected so that the process of reading data is performed for sure.

On the other hand, when there is a data write access, the copy-source-device selecting unit 70 sets a hard disk device 87 from which no sign of a failure has been detected as a copy source from among the hard disk devices 86 and 87 to which the same data is stored by mirroring. Then, the redundant-copy-execution control unit 69 performs a control of copying data to a backup hard disk device 88.

In this case, the data-read/write control unit 68 performs a control of executing a process of writing data with respect to the hard disk device 86 from which a sign of a failure has been detected, the hard disk device 87 from which no sign of a failure has been detected, and the backup hard disk device 88.

In this manner, when there is a data write access, a redundant copy is executed by setting the hard disk device 87 from which no sign of a failure has been detected as the copy source so that the redundant copy process is performed for sure.

Figure 6:
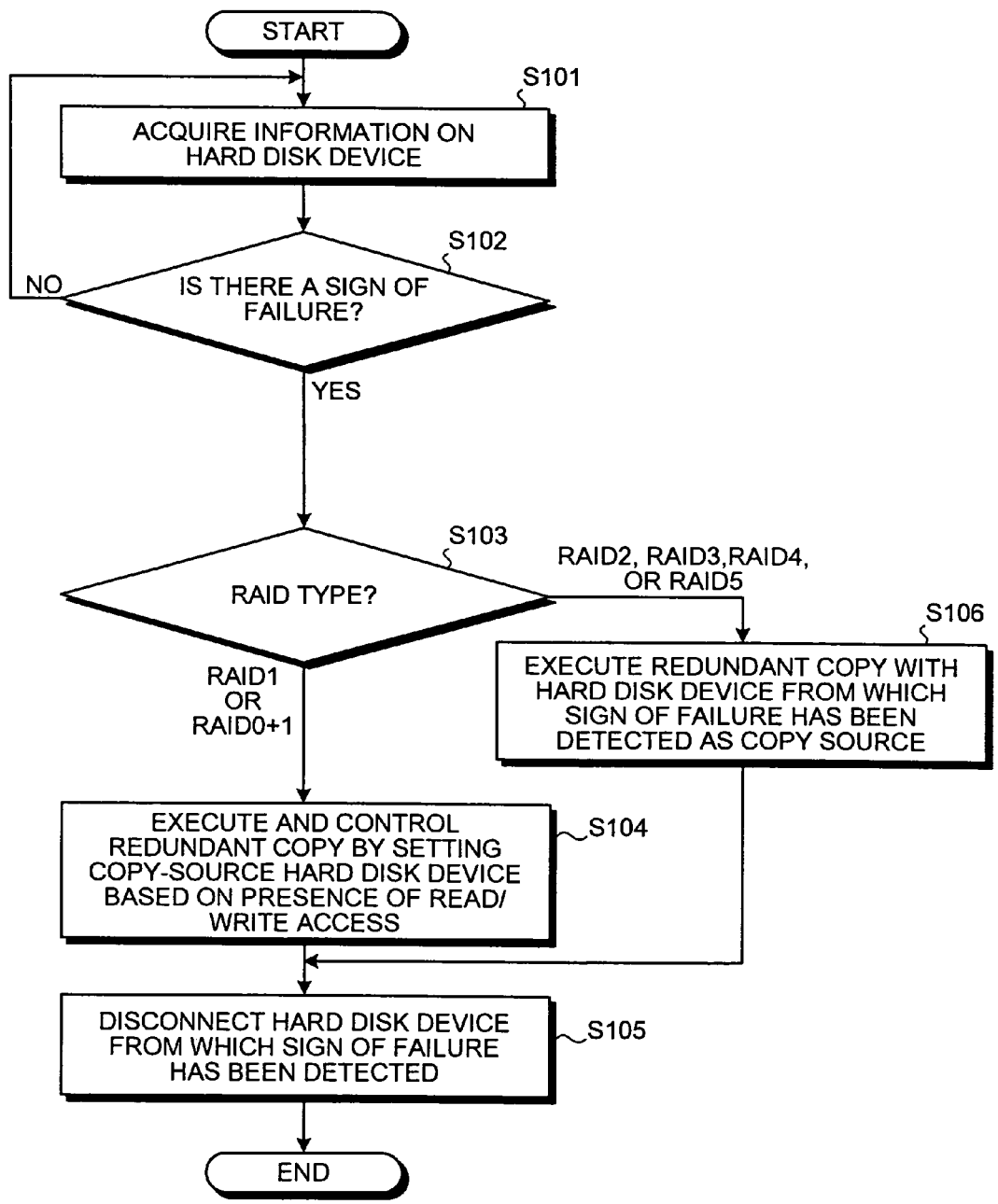
FIG. 6 is a flowchart of a process procedure for the data-duplication control process according to the present embodiment.

FIG. 6 is a flowchart of a process procedure for a data-duplication control process according to the present embodiment As shown in FIG. 6, the failure-sign detecting unit 66 of the RAID device acquires information on the hard disk devices $50_1$ to $50_{19}$ from the storing unit 61 (Step S101). The information on the hard disk devices $50_1$ to $50_{19}$ includes the RAID-type management table 62, the failure-occurrence information 63, and the failure-sign-detection threshold information 64.

The failure-sign detecting unit 66 detects whether there is a sign of a failure in the hard disk devices $50_1$ to $50_{16}$ by checking if the number of failures occurred has exceeded a threshold determined for each of the RAID types (Step S102).

When no sign of a failure has been detected ("NO" at Step S102), the process returns to Step S101, and the failure-sign detecting unit 66 repeats the process of acquiring the information on the hard disk devices $50_1$ to $50_{16}$ from the storing unit 61.

On the other hand, when a sign of a failure has been detected ("YES" at Step S102), the copy-source-device selecting unit 70 checks a RAID type of the hard disk devices $50_1$ to $50_{16}$ from which the sign of a failure has been detected (Step S103).

When the RAID type of the hard disk devices $50_1$ to $50_{16}$ from which the sign of a failure has been detected is RAID1 or RAID0+1 (Step S103, RAID1 or RAID0+1), the copy-source-device selecting unit 70 sets a hard disk device $50_1$ to $50_{16}$ of a copy source according to a presence of a read/write access with respect to the hard disk devices $50_1$ to $50_{16}$ (Step S104).

After that, the redundant-copy executing unit 69 cuts the hard disk devices $50_1$ to $50_{16}$ from which the sign of a failure has been detected from the command processing unit 65 (Step S105), and terminates the data-duplication control process.

On the other hand, when the RAID type of the hard disk devices $50_1$ to $50_{16}$ from which the sign of a failure has been detected is RAID2, RAID3, RAID4, or RAID5 at Step S103 (Step S103, RAID2, RAID3, RAID4, or RAID5), the copy-source-device selecting unit 70 sets a hard disk device $50_1$ to $50_{16}$ as a copy source; and the redundant-copy-execution control unit 69 performs a control of executing a redundant copy (Step S106).

After that, the process moves to Step S105, and the redundant-copy executing unit 69 cuts the hard disk devices $50_1$ to $50_{16}$ from which the sign of a failure has been detected from the command processing unit 65, and terminates the data-duplication control process.

Figure 7:
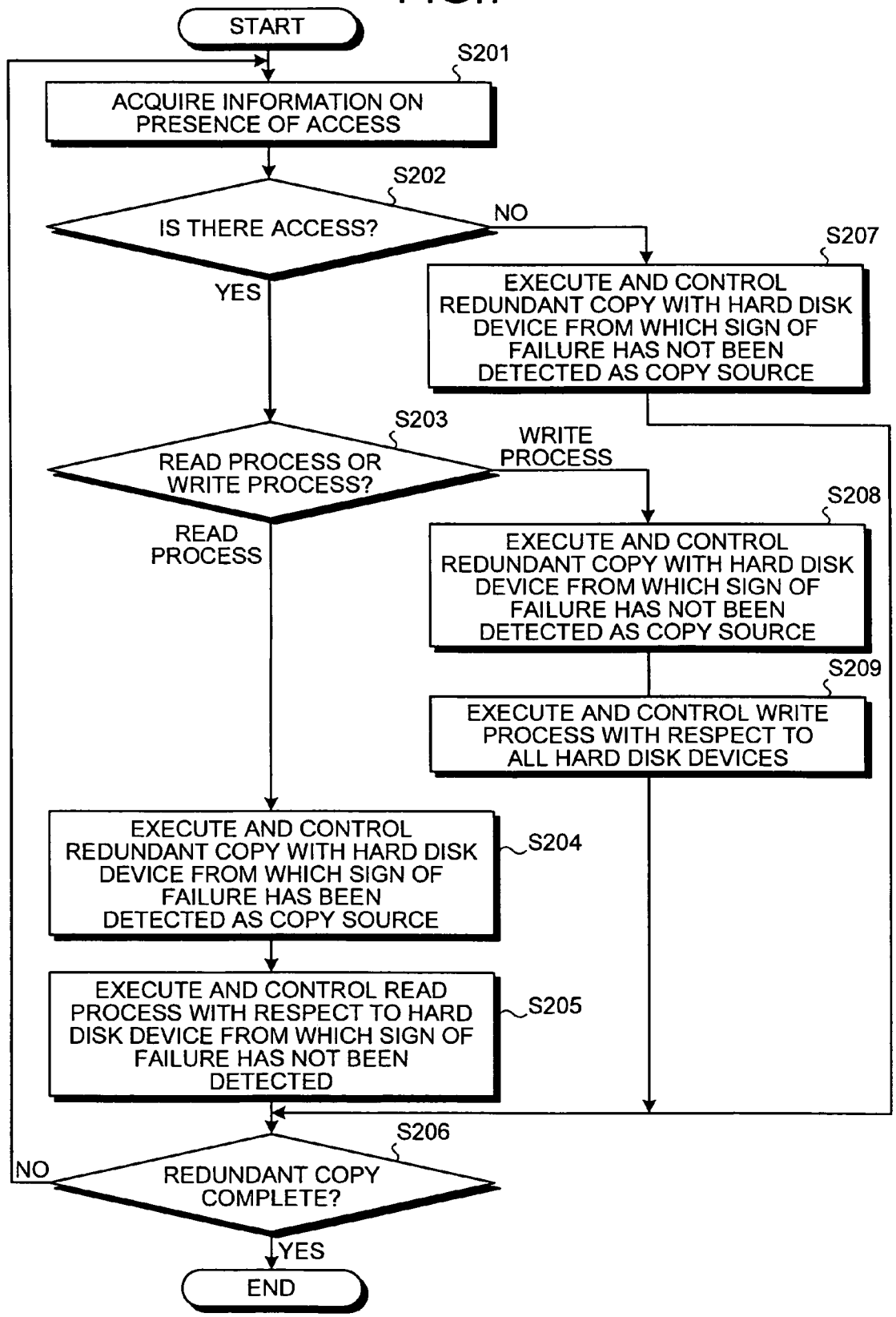
FIG. 7 is a flowchart for a process procedure for a redundant-copy execution process in RAID1 or RAID0+1.

FIG. 7 is a flowchart for a process procedure for a redundant-copy execution process in RAID1 or RAID0+1.

As shown in FIG. 7, the copy-source-device selecting unit 70 of the RAID device acquires information on a presence of a data read access or a data write access with respect to the hard disk devices $50_1$ to $50_{16}$ (Step S201), and check if there is an access to the hard disk devices $50_1$ to $50_{16}$ (Step S202).

When there is no access ("NO" at Step S202), the copy-source-device selecting unit 70 sets the hard disk devices $50_1$ to $50_{16}$ from which no sign of a failure has been detected as a copy source; and the redundant-copy-execution control unit 69 performs a control of executing a redundant copy (Step S207).

After that, the redundant-copy-execution control unit 69 checks if the redundant copy is completed (Step S206), and when the redundant copy is not completed ("NO" at Step S206), moves to Step S201 to proceed to the next process. On the other hand, when the redundant copy is completed ("YES" at Step S206), the redundant-copy-execution control unit 69 terminates the redundant copy.

When there is an access to the hard disk devices $50_1$ to $50_{16}$ at Step S202 ("YES" at Step S202), the copy-source-device selecting unit 70 checks whether the access is a data read process or a data write process (Step S203).

When the access is for the data read process (Step S203, read process), the copy-source-device selecting unit 70 sets the hard disk devices $50_1$ to $50_{16}$ from which a sign of a failure has been detected as a copy source; and the redundant-copy-execution control unit 69 performs a control of executing a redundant copy (Step S204).

The data-read/write control unit 68 performs a control of executing a read process to read data from the hard disk devices $50_1$ to $50_{16}$ from which no sign of a failure has been detected (Step S205), moves to Step S206, and continues to perform the next process.

On the other hand, when the access is for the data write process at Step S203 (Step S203, write process), the copy-source-device selecting unit 70 sets the hard disk devices $50_1$ to $50_{16}$ from which no sign of a failure has been detected as a copy source; and the redundant-copy-execution control unit 69 performs a control of executing a redundant copy (Step S208).

Then, the data-read/write control unit 68 performs a control of executing a write process to write data with respect to the hard disk devices $50_1$ to $50_{16}$ from which a sign of a failure has been detected, the hard disk devices $50_1$ to $50_{16}$ from which no sign of a failure has been detected, and the backup hard disk devices $50_{17}$ to $50_{19}$ that are the copy destination of the data (Step S209), moves to Step S206, and continues to perform the next process.

Each of the processes described in the above embodiment can be implemented by executing a program prepared in advance on a computer. Following is an explanation of an example of a computer that executes a program to realize the various processes described above.

Figure 8:
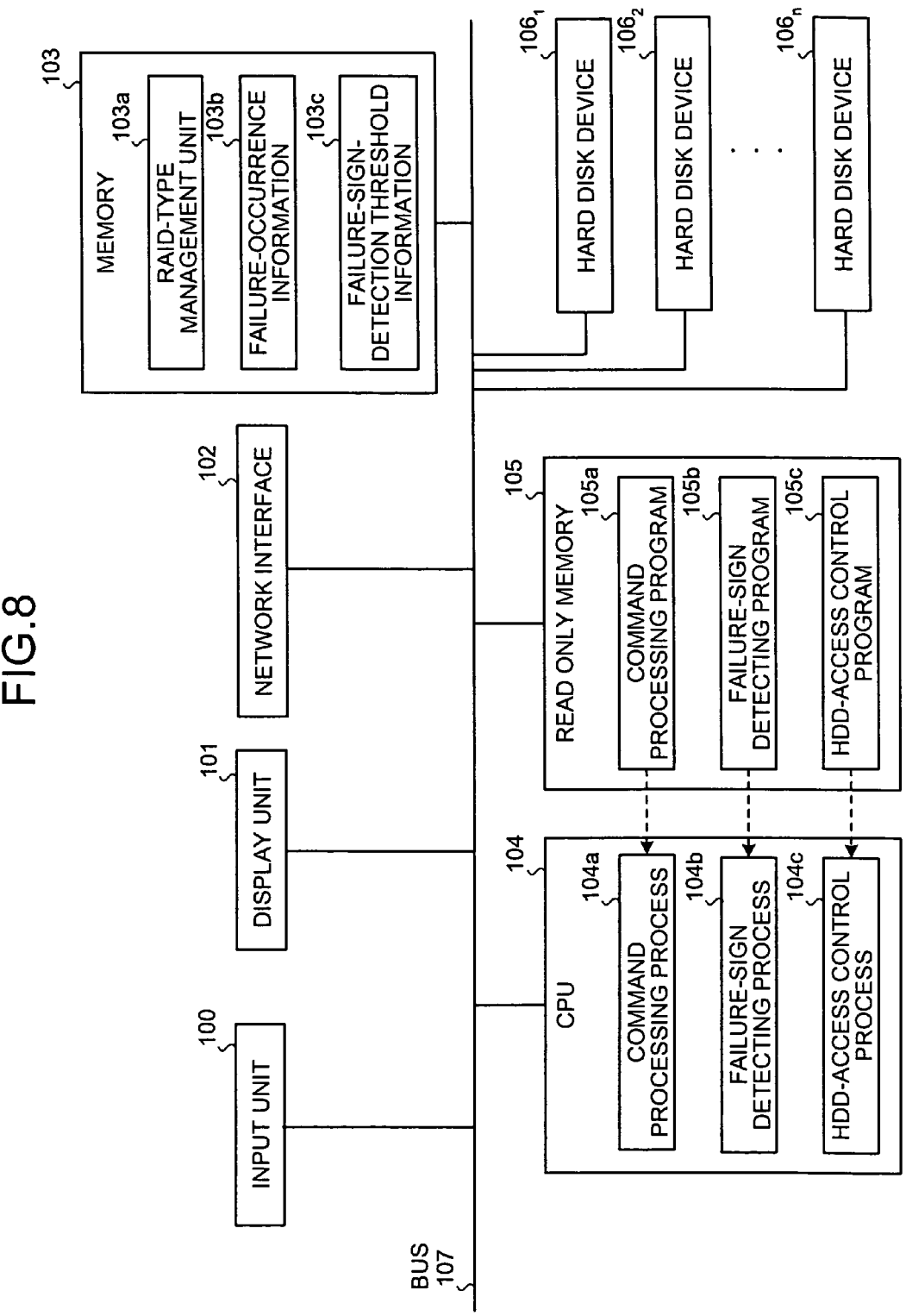
FIG. 8 is a schematic diagram for illustrating a hardware configuration of a computer that becomes the RAID device 30 shown in FIG. 2.

FIG. 8 is a schematic diagram for illustrating a hardware configuration of a computer that becomes the RAID device shown in FIG. 2. The computer includes an input unit 100 that receives an input of data from a user, a display unit 101 that displays the data, a network interface 102 that exchanges the data with other computer via a network, a memory 103, a central processing unit (CPU) 104, a read only memory 105, and hard disk devices $106_1$ to $106_n$, connected via a bus 107. The hard disk devices $106_1$ to $106_n$ correspond to the hard disk devices $50_1$ to $50_{19}$ shown in FIG. 2.

In the read only memory 105, programs having the same function as the function of the RAID device, i.e., a command processing program 105a, a failure-sign detecting program 105b, and a HDD-access control program 105c shown in FIG. 8 are stored.

The command processing program 105a, the failure-sign detecting program 105b, and the HDD-access control program 105c can be stored in an integral manner or in a distributed manner as desired.

The CPU 104 reads the command processing program 105a, the failure-sign detecting program 105b, and the HDD-access control program 105c from the read only memory 105 to execute the programs, and thereby functioning as a command processing process 104a, a failure-sign detecting process 104b, and a HDD-access control process 104c.

The command processing process 104a corresponds to the command processing unit 65 shown in FIG. 2; the failure-sign detecting process 104b corresponds to the failure-sign detecting unit 66 shown in FIG. 2; and the HDD-access control process 104c corresponds to the HDD-access control unit 67, i.e., the data-read/write control unit 68, the redundant-copy-execution control unit 69, and the copy-source-device selecting unit 79 shown in FIG. 2.

In the memory 103, a RAID-type management table 103a, failure-occurrence information 103b, and failure-sign-detection threshold information 103c are stored. The RAID-type management table 103a, the failure-occurrence information 103b, and the failure-sign-detection threshold information 103c correspond to the RAID-type management table 62, the failure-occurrence information 63, and the failure-sign-detection threshold information 64 shown in FIG. 2, respectively.

The CPU 104 stores the RAID-type management table 103a, the failure-occurrence information 103b, and the failure-sign-detection threshold information 103c in the memory 103, and reads the RAID-type management table 103a, the failure-occurrence information 103b, and the failure-sign-detection threshold information 103c from the memory 103 to execute various data processes.

The command processing program 105a, the failure-sign detecting program 105b, and the HDD-access control program 105c are not necessarily to be stored in the read only memory 105 from the beginning.

For example, the command processing program 105a, the failure-sign detecting program 105b, and the HDD-access control program 105c can be stored in a fixed-type physical medium, such as a flexible disk (FD), a compact disk-read only memory (CD-ROM), a magneto-optical (MO) disk, a digital versatile disk (DVD), a optical-magnetic disk, an integrated-circuit (IC) card, or other computer (or server) connected to the computer via a public line, the internet, a local area network (LAN), and a wide area network (WAN) so that the computer reads each program and executes the program read.

As described above, according to the present embodiment, the storing unit 61 of the RAID device stores information on the RAID type of the hard disk devices $50_1$ to $50_{16}$ in the RAID-type management table 62; and the copy-source-device selecting unit 70 selects a hard disk device $50_1$ to $50_{16}$ of a copy source based on the RAID-type management table 62. Therefore, when the hard disk devices $50_1$ to $50_{16}$ of different RAID types are used in the RAID device in a combined manner, it is possible to execute a redundant copy of data effectively by selecting the hard disk devices $50_1$ to $50_{16}$ of a copy source according to the RAID type.

Furthermore, according to the present embodiment, the failure-sign detecting unit 66 detects a sign of a failure in the hard disk devices $50_1$ to $50_{16}$; and the copy-source-device selecting unit 70 selects a hard disk device $50_1$ to $50_{16}$ of a copy source based on the RAID-type of the hard disk devices $50_1$ to $50_{16}$ from which the sign of a failure has been detected. Therefore, it is possible to execute a redundant copy of data effectively before a failure actually occurs by detecting the sign of a failure.

Moreover, according to the present embodiment, when a hard disk device $50_1$ to $50_{16}$ belongs to a RAID type of RAID1 or RAID0+1 in which the same data is stored in a plurality of hard disk devices $50_1$ to $50_{16}$, the copy-source-device selecting unit 70 selects a hard disk device $50_1$ to $50_{16}$ of a duplication source from among the hard disk devices $50_1$ to $50_{16}$ that store the same data according to an access status to the hard disk device $50_1$ to $50_{16}$. Therefore, it is possible to perform a redundant copy of data effectively by selecting an appropriate hard disk device $50_1$ to $50_{16}$ of the duplication source corresponding to the access status.

Furthermore, according to the present embodiment, when an access regarding to readout of data stored in a hard disk device $50_1$ to $50_{16}$ has been issued, the copy-source-device selecting unit 70 selects a hard disk device $50_1$ to $50_{16}$ from which a sign of a failure has been detected as a copy source from among a plurality of hard disk devices $50_1$ to $50_{16}$ that store the same data, and the data-read/write control unit 68 reads data from a hard disk device $50_1$ to $50_{16}$ from which no sign of a failure has been detected. Therefore, it is possible to perform the readout of data efficiently while performing a process of duplicating the data.

Moreover, according to the present embodiment, when an access regarding to storing of data with respect to a hard disk device $50_1$ to $50_{16}$ has been issued, the copy-source-device selecting unit 70 selects a hard disk device $50_1$ to $50_{16}$ other than a hard disk device $50_1$ to $50_{16}$ from which a sign of a failure has been detected as a copy source from among a plurality of hard disk devices $50_1$ to $50_{16}$ that store the same data. Therefore, it is possible to reduce a risk of break down of a process of duplicating data due to an occurrence of a failure during the process of duplicating data.

Furthermore, according to the present embodiment, because the failure-sign detecting unit 66 detects a sign of a failure with respect to a hard disk device $50_1$ to $50_{16}$ of each of RAID types based on whether the number of occurrences of a failure regarding to reading or writing data in a hard disk device $50_1$ to $50_{16}$ has exceeded a predetermined threshold set for each of RAID types, it is possible to change a level of detecting the sign of failure according to a level of reliability of a hard disk device $50_1$ to $50_{16}$ of each of the RAID types against a failure by setting a different threshold for different RAID type.

Although the invention has been described with respect to a specific embodiment for a complete and clear disclosure, the present invention can be embodied in all modifications and alternative constructions that may occur to one skilled in the art which fairly fall within the scope of the technical idea described in the scope of the claims.

Furthermore, from among the various processes described in the present embodiment, a part of or all the processes explained as automatically performed can be manually performed, and a part of or all the processes explained as manually performed can be automatically performed.

Besides, a process procedure, a control procedure, a concrete name, and information including various types of data and parameters can be optionally changed not elsewhere specified.

Each of the constituent elements of the RAID device is shown in the drawings in a conceptual basis, and it is not necessary to be configured physically as shown in the drawings. In other words, a concrete shape of distribution or integration of the RAID device is not limited to the ones shown in the drawings, and a part of or all the constituent elements can be distributed or integrated in an arbitrary unit functionally and physically according to a variety of loads and usage situations.

Furthermore, a part of or all the process functions performs in the RAID device can be realized by a CPU and a program that is analyzed and executed by the CPU or a hardware by a wired logic.

According to the present invention, because information on the RAID type of a storage device is stored, and a storage device of a duplication source is selected based on the information stored, it is possible to perform a redundant copy of data effectively by selecting a storage device of the duplication source for the redundant copy corresponding to the RAID type.

Furthermore, according to the present invention, because a sign of a failure with respect to a storage device is detected, and a storage device of a duplication source is selected based on information on a RAID type of the storage device from which the sign of a failure has been detected, it is possible to perform a redundant copy of data effectively before the failure actually occurs by detecting the sign of the failure.

Moreover, according to the present invention, when a storage device belongs to a type of RAID in which the same data is stored in a plurality of storage devices, a storage device of a duplication source is selected from among the storage devices that store the same data according to an access status to a storage device. Therefore, it is possible to perform a redundant copy of data effectively by selecting an appropriate storage device of the duplication source corresponding to the access status.

Furthermore, according to the present invention, when an access regarding to readout of data stored in a storage device has been issued, a storage device from which a sign of a failure has been detected is selected as a duplication source from among a plurality of storage devices that store the same data, and the data is read from a storage device from which no sign of a failure has been detected. Therefore, it is possible to perform the readout of data efficiently while performing a process of duplicating the data.

Moreover, according to the present invention, when an access regarding to storing of data with respect to a storage device has been issued, a storage device other than a storage device from which a sign of a failure has been detected is selected as a duplication source from among a plurality of storage devices that store the same data. Therefore, it is possible to reduce a risk of break down of a process of duplicating data due to an occurrence of a failure during the process of duplicating data.

Furthermore, according to the present invention, because a sign of a failure is detected with respect to a storage device of each of RAID types based on whether the number of occurrences of a failure regarding to reading or writing data in a storage device has exceeded a predetermined threshold set for each of RAID types, it is possible to change a level of detecting the sign of failure according to a level of reliability of a storage device of each of the RAID types against a failure by setting a different threshold for different RAID type.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data-duplication control apparatus that controls a duplication process for duplicating data stored in a storage device that constitutes redundant-array-of-independent-disks, the data-duplication control apparatus comprising:
   an information storing unit that stores information on a level of the redundant-array-of-independent-disks of the storage device;
   a failure-sign detecting unit that detects a sign of a failure with respect to the storage device;
   a duplication-source-device selecting unit that selects a storage device of a duplication source based on the information stored; and
   a data reading unit that reads data stored in a storage device, wherein
   when the storage device belongs to a level of the redundant-array-of-independent-disks in which same data is stored in a plurality of storage devices, and when an access regarding to readout of data stored in the storage device has been issued, the duplication-source-device selecting unit selects the storage device from which the sign of a failure has been detected as the duplication source from among the storage devices that store the same data, and the data reading unit reads the data from a storage device from which no sign of a failure has been detected.

2. The data-duplication control apparatus according to claim 1, wherein
the duplication-source-device selecting unit selects the storage device of the duplication source based on information on the level of the redundant-array-of-independent-disks of a storage device from which the sign of a failure has been detected.

3. The data-duplication control apparatus according to claim 2, wherein when an access regarding to storing of data with respect to the storage device has been issued, the duplication-source-device selecting unit selects a storage device other than the storage device from which the sign of a failure has been detected as the duplication source from among the storage devices that store the same data.

4. The data-duplication control apparatus according to claim 1, wherein the failure-sign detecting unit detects the sign of a failure with respect to a storage device of each of the levels of the redundant-array-of-independent-disks based on whether number of occurrences of a failure regarding to readout or storing of data with respect to the storage device has exceeded a predetermined threshold set for each of the levels of the redundant-array-of-independent-disks.

5. A data-duplication control method of controlling a duplication process for duplicating data stored in a storage device that constitutes redundant-array-of-independent-disks, the data-duplication control method comprising:
   storing information on a level of the redundant-array-of-independent-disks of the storage device;
   detecting a sign of a failure with respect to the storage device;
   selecting a storage device of a duplication source based on the information stored; and
   reading data stored in a storage device, wherein
   when the storage device belongs to a level of the redundant-array-of-independent-disks in which same data is stored in a plurality of storage devices, and when an access regarding to readout of data stored in the storage device has been issued, the selecting includes selecting the storage device from which the sign of a failure has been detected as the duplication source from among the storage devices that store the same data, and
   the reading includes reading the data from a storage device from which no sign of a failure has been detected.

6. The data-duplication control method according to claim 5, wherein
the selecting includes selecting the storage device of the duplication source based on information on the level of the redundant-array-of-independent-disks of a storage device from which the sign of a failure has been detected.

7. The data-duplication control method according to claim 6, wherein when an access regarding to storing of data with respect to the storage device has been issued, the selecting includes selecting a storage device other than the storage device from which the sign of a failure has been detected as the duplication source from among the storage devices that store the same data.

8. The data-duplication control method according to claim 6, wherein the detecting includes detecting the sign of a failure with respect to a storage device of each of the levels of the redundant-array-of-independent-disks based on whether number of occurrences of a failure regarding to readout or storing of data with respect to the storage device has exceeded a predetermined threshold set for each of the levels of the redundant-array-of-independent-disks.

9. A computer-readable recording medium that stores a data-duplication control program for controlling a duplication process for duplicating data stored in a storage device that constitutes redundant-array-of-independent-disks, wherein the data-duplication control program makes a computer execute storing information on a level of the redundant-array-of-independent-disks of the storage device;

detecting a sign of a failure with respect to the storage device;

selecting a storage device of a duplication source based on the information stored; and reading data stored in a storage device, wherein when the storage device belongs to a level of the redundant-array-of-independent-disks in which same data is stored in a plurality of storage devices, and when an access regarding to readout of data stored in the storage device has been issued, the selecting includes selecting the storage device from which the sign of a failure has been detected as the duplication source from among the storage devices that store the same data, and the reading includes reading the data from a storage device from which no sign of a failure has been detected.

10. The computer-readable recording medium according to claim 9, wherein the selecting includes selecting the storage device of the duplication source based on information on the level of the redundant-array-of-independent-disks of a storage device from which the sign of a failure has been detected.

11. The computer-readable recording medium according to claim 10, wherein when an access regarding to storing of data with respect to the storage device has been issued, the selecting includes selecting a storage device other than the storage device from which the sign of a failure has been detected as the duplication source from among the storage devices that store the same data.

12. The computer-readable recording medium according to claim 10, wherein the detecting includes detecting the sign of a failure with respect to a storage device of each of the levels of the redundant-array-of-independent-disks based on whether number of occurrences of a failure regarding to readout or storing of data with respect to the storage device has exceeded a predetermined threshold set for each of the levels of the redundant-array-of-independent-disks.

13. A method, comprising:

storing information on a level of redundant-array-of-independent-disks RAIDs;

detecting a sign of a failure with respect to a RAID;

reading data stored in the RAID; and when, based on the stored RAID level information, the RAID belongs to a level of RAID in which same data is stored in a plurality of disks and upon the reading of the data stored in the RAID, selecting from among the disks that store the same data a disk for which the sign of a failure has been detected as the duplication source, and reading the data from a disk from which no sign of a failure has been detected.

* * * * *